United States Patent

[11] 3,584,235

[72] Inventors Hatsuaki Fukui
Summit;
William J. McNamara, North Plainfield,
both of, N.J.
[21] Appl. No. 768,781
[22] Filed Oct. 18, 1968
[45] Patented June 8, 1971
[73] Assignee Bell Telephone Laboratories, Incorporated
Murray Hill, Berkeley Heights, N.J.

[54] VIDEO DEFECT ELIMINATOR
3 Claims, 3 Drawing Figs.

[52] U.S. Cl. ........ 307/237,
178/6, 307/218, 307/234, 307/254, 328/163,
328/165
[51] Int. Cl. ........ H03k 5/08
[50] Field of Search ........ 307/208,
218, 234, 254, 237; 328/163; 178/7.3, 6; 328/165

[56] References Cited
UNITED STATES PATENTS

| | | | |
|---|---|---|---|
| 3,072,855 | 1/1963 | Chandler | 328/165 |
| 3,076,145 | 1/1963 | Copeland et al. | 328/165 |
| 3,378,695 | 4/1968 | Morette | 307/237 |
| 3,453,386 | 7/1969 | Hofmann | 178/6 |

OTHER REFERENCES

Pressman, " Design of Transistorized Circuits for Digital Computers," John F. Rider, pages 10— 273 and 10— 274, 1959.

*Primary Examiner*—Donald D. Forrer
*Assistant Examiner*—R. C. Woodbridge
*Attorneys*—R. J. Guenther and Arthur J. Torsiglieri

ABSTRACT: The specification describes a circuit for eliminating spurious voltage transients from video signals, typically arising from defects in the target of the camera tube. It comprises a two-transistor gate in combination with a delay network in one channel so that the transients reach the gate transistors at slightly different times. The unwanted pulse is blocked by the gate. Selective gain is used to narrow the pulse width of the high frequency defects so that a greater number of defects will fall within a given delay period.

INVENTORS H. FUKUI
W. J. McNAMARA
BY
ATTORNEY

VIDEO DEFECT ELIMINATOR

This invention relates to electrical processing of video signals to eliminate spurious voltage peaks.

Stationary bright spot defects in a reconstructed video picture are especially objectionable to the viewer. These imperfections are commonly caused by localized leakage defects in the target of the camera tube While such defects can be minimized by using high quality materials and precision manufacturing methods it now appears that other indirect approaches to defect elimination will be useful. These indirect methods generally involve electrically processing the video signal to remove the spurious voltage transients produced by the target defects. These methods also can eliminate spurious signals from other origins. Several electrical circuits designed to filter or discriminate high frequency voltage peaks have been investigated. During the course of the investigation a novel circuit has been designed which is particularly effective for the desired purpose and this circuit forms the basis for this invention.

Considered broadly the circuit relies on a delay network and gate which together remove from the signal all transient voltage peaks having a duration shorter than the delay time of the delay network. Since the spurious peaks originating from localized target defects are high frequency pulses having very short durations they can be effectively removed from the signal without significant loss of information. All transients falling within the delay time of the network are eliminated. As the delay time is increased wider spurious peaks are removed. At the same time however, portions of the actual signal are eliminated. Thus there is a trade-off between defect elimination and picture quality. Even though discrimination between spurious and actual signal is incomplete a considerable improvement in picture quality is clearly evident when the circuit of this invention is employed.

The voltage transients reflecting target defects which occur during the delay period are removed by a transistor gate. The gate consists of two matched transistors connected in a common collector mode with the signal fed to the base of one transistor and the delayed signal introduced to the base of the other transistor. The emitter load is common to both transistors. The output voltage from this gate circuit will always follow the most negative (with PNP transistors) or positive (with NPN transistors) of the two input signals.

This arrangement is useful for eliminating narrow high peak defects but the trade-off mentioned above quickly comes into play and it may be necessary to significantly degrade the signal in order to remove the wider defects. If this occurs, and it often does in practice, resort can be had to a preferred embodiment of this invention wherein high frequency boosting is employed to narrow the pulse duration of the high frequency components of the signal. The high frequency boost satisfies the functional relationship:

$$G=1+k(f/f_o)^x \qquad (1)$$

where $G$ is gain, $k$ is a constant of the circuit selected for this function, $f$ is the instantaneous signal frequency, $f_o$ is a reference frequency related to the maximum width of a defect that can effectively be eliminated in the gate, and $x$ has a value greater than one, and greater than 1.5 in a preferred case.

Inherent is this selective amplifier is the fact that as the amplitude of high frequency pluses is increased the pulse width narrows so that pulses having widths that would otherwise fall outside the effective range of the gate can now be eliminated. This expedient can extend the effective range of the gate to defects having 50 percent greater widths than those which would normally be eliminated.

These and other aspects of the invention will be explained more fully in the following detailed description. In the drawing.

Figure 1:
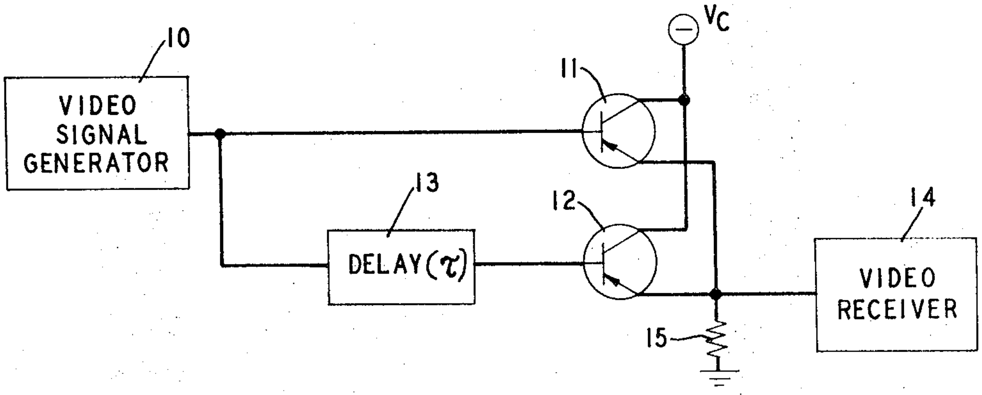
FIG. 1 is a schematic circuit diagram of a gate circuit which is an essential part of the defect eliminating circuit of the invention.

The gate circuit which performs the basic defect eliminating function is shown in FIG. 1 The input from video signal generator 10 is divided into two paths and fed to the base of the two matched transistors 11 and 12. A delay element 13 is introduced into one branch of the circuit. The output signal developed across the emitter load 15 is utilized by video receiver 14. The transistors are biased with a common collector voltage $V_c$ and are operated in the common collector or emitter follower configuration as follows:

When a negative signal is applied to the gate input and is divided by the delay network the signal impressed on transistor 12 will be delayed by a time increment $\tau$. A spurious high frequency voltage peak will arrive at transistor 11 slightly before it arrives at transistor 12. Since the voltages appearing at the two transistors are now different the gate operation of the circuit blocks the higher voltage and the output voltage follows the most negative voltage arriving at the two transistors. The common collector, or emitter follower, configuration is especially suitable for the invention since the emitter follower is rarely driven into saturation because of the high negative voltage feedback. Because saturation does not occur, the response of the emitter follower is more rapid than that of other configurations.

Figure 2:
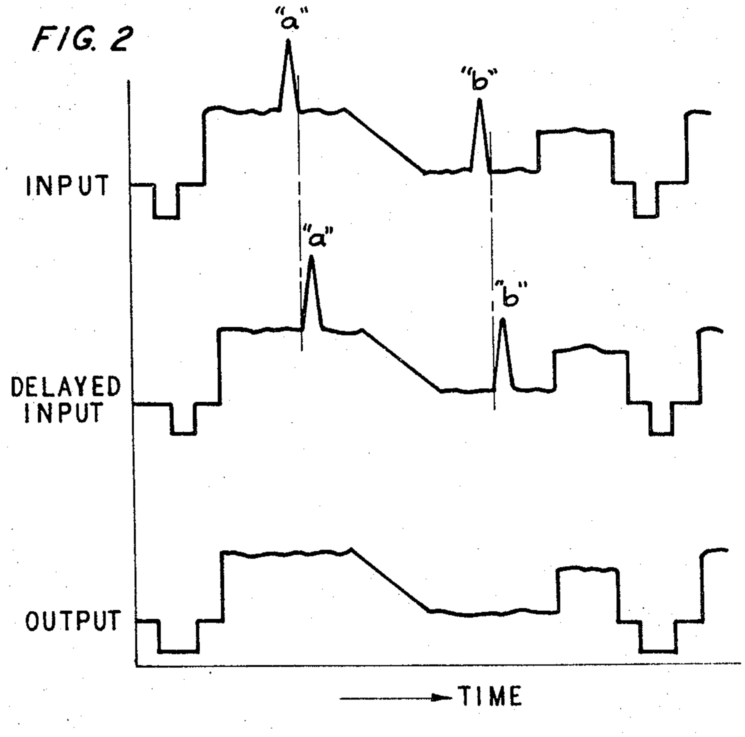
FIG. 2 is a schematic representation of a typical signal being processed in the circuit of FIG. 1.

The foregoing operation is described schematically in FIG. 2. The input of the illustrated signal is plotted with time as the abscissa. The delayed signal input to transistor 11 is an identical trace lagging the input slightly. Defects appear as pulses "*a*" and "*b*." The output voltage is a composite of the most negative values of the two signals and thus the two defects do not appear.

It was previously indicated that the voltage peaks characteristic of some defects are often longer than the delay time which is consistent with good video picture resolution. Thus although it is possible to usefully employ the gate of FIG. 1 as a defect eliminator a preferred embodiment makes use of selective gain to boost the amplitude of the high frequency components thereby shortening their effective pulse width. This function which is described by Equation (1) above can be achieved by a known aperture-correction circuit or by a circuit consisting of a straight through channel and another channel in which two differentiation circuits are used. The invention can be adequately understood with a consideration of the latter alternative which is given as exemplary of circuits which provide the selective gain function described by Equation (1).

Figure 3:
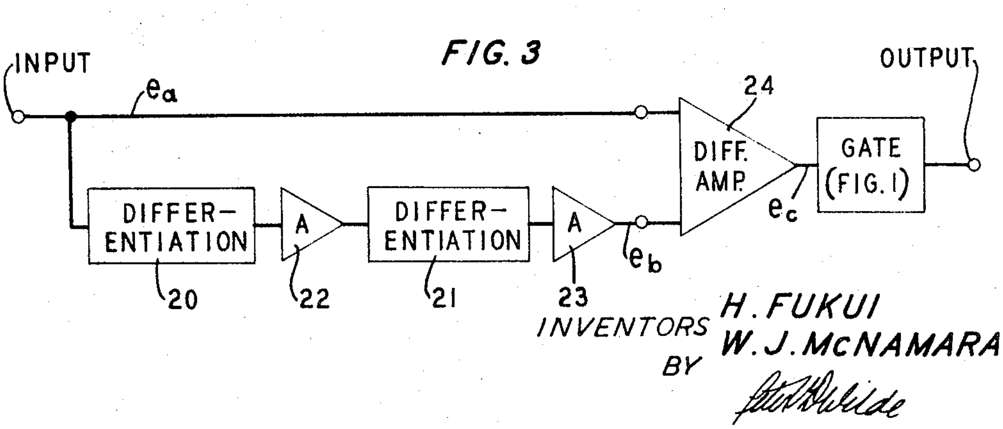
FIG. 3 is a block diagram of an exemplary circuit useful for obtaining the function of Equation (1).

A block diagram of the circuit is shown in FIG. 3. The input is divided into a straight through channel and a two-stage differentiation channel. The differentiation stages 20 and 21 can be standard RC networks and each is followed in turn by amplifiers 22 and 23, respectively. The input from this channel is subtracted from the straight channel in differential amplifier 24.

The function of this circuit becomes evident from the following.

Assume a sinusoidal input into the network of FIG. 3. The input, $e_a$, to differential amplifier 24 from the straight through channel will be simply:

$$e_a=E_a \sin \omega t \ . \qquad (2)$$

The input, $e_b$, from the two-stage differentiation channel will be:

$$e_b=-\frac{k}{\omega_0^2}\omega^2 E_a \sin \omega t \qquad (3)$$

where $k$ is a constant associated with the gain of this channel and $\omega_o$ is an angular reference frequency related to the time constant of the differentiation circuits.

The output of the amplifier 24, $e_c$, is the difference of (3) and (2) or:

$$e_c=[1+(f/f_o)^2]e_a \ . \qquad (4)$$

This will be recognized as the function described by Equation (1), for the case of $x=2$.

The distortion introduced into the signal by the delay was calculated rigorously yielding the result that for minimum distortion the signal frequency-delay time product should be controlled to below 0.45. This is due to the fact that the distortion factor includes a tangent function and becomes infinite at a frequency-delay product of 0.05. The distortion factor decreases to zero at zero delay and this further describes the trade-off between delay time and distortion previously mentioned. Harmonic distortion is also lowest at low delay values. It therefore becomes most useful to operate at the edge of the gross distortion region in the frequency-delay time versus distortion relationship. A preferred range for the frequency-delay product is 0.20 to 0.49.

The gate circuit described above and illustrated in FIG. 1 employs PNP transistors but could also employ NPN devices with the signal polarity reversed. Diodes are capable of performing the gate function, however the leakage current in a diode gate tends to be undesirably high. Exemplary parameters yielding high performance of the combined gate and booster circuit for 1 MHz. baseband video transmission are as follows:

Reference frequency ($f_o$) = 1.1 MHz.

Delay time ($\tau$) = 0.43 $\mu$sec.

Booster circuit constant $k$ = 0.6.

The circuit constant $k$ can be varied over the range of 0.3 to 1.5. For the booster circuit of FIG. 3 the value of $x$ in Equation (1) is 2.

The defect eliminator of this invention is believed to be most effectively applied to the processing of video signals. This is due to the nature of the distortion introduced into the signal by the gate circuit with the delay network. Thus, although the video components 10 and 14 shown in FIG. 1 are intended as conventional, the use of the defect eliminator in a video system is believed to be important.

What we claim is.

1. A defect eliminator for removing spurious voltage transients from a video signal comprising a transistor gate circuit comprising two matched transistors connected in parallel, means for biasing the collector of each transistor with a common voltage so as to operate the transistors in a common collector or emitter follower configuration, a delay network connected in series with the base of one transistor, input means adapted for connecting a video signal generator as the base input of the transistor gate circuit, output means adapted for connecting a video receiver to the emitter output of the gate circuit, and a selective gain circuit interposed between the video signal generator and the transistor gate the selective gain circuit providing the approximate function:

$$G=1+k(f/f_o)^x$$

where $G$ is gain, $k$ is the circuit constant and has a value between 0.6 and 1.5, $f$ is the instantaneous signal frequency, $f_o$ is an arbitrary reference frequency, and $x$ has a value greater than 1.

2. The defect eliminator of claim 1 wherein the selective gain is obtained with a dual channel amplifier comprising a straight channel, a two-stage differentiating channel and a differential amplifier for combining the two channels.

3. The defect eliminator of claim 2 further including an amplifier following each differentiating stage.